United States Patent [19]
Milne et al.

[11] Patent Number: 5,233,730
[45] Date of Patent: Aug. 10, 1993

[54] CABLE GRIP

[75] Inventors: Douglas Milne, Vancouver; Alain Gendron, Ste-Catherine, both of Canada

[73] Assignee: Noranda, Inc., Toronto, Canada

[21] Appl. No.: 897,993

[22] Filed: Jun. 16, 1992

[30] Foreign Application Priority Data

Jul. 8, 1991 [CA] Canada .................................. 2047013

[51] Int. Cl.⁵ ............................................ F16G 11/00
[52] U.S. Cl. .................... 24/136 R; 24/115 M; 403/314
[58] Field of Search ............ 24/136 R, 136 L, 115 M, 24/503; 403/211, 314, 369, 374

[56] References Cited

U.S. PATENT DOCUMENTS

| | | | |
|---|---|---|---|
| 2,177,364 | 10/1939 | Fotsch | 403/314 |
| 2,180,866 | 11/1939 | Cryer | 403/314 |
| 2,223,153 | 11/1940 | Seifer | 24/115 M |
| 3,852,850 | 12/1974 | Filhaber | 24/136 R |
| 3,879,147 | 4/1975 | Morell | 24/115 M |
| 3,952,377 | 4/1976 | Morell | 24/136 R |
| 4,455,717 | 6/1984 | Gray | 24/136 R |
| 4,627,762 | 12/1986 | Scotti | 24/136 R |
| 4,782,560 | 11/1988 | Keller | 24/115 M |
| 5,015,023 | 5/1991 | Hall | 24/136 R |

FOREIGN PATENT DOCUMENTS 0958284  5/1964  United Kingdom ............ 24/115 M

Primary Examiner—Victor N. Sakran
Attorney, Agent, or Firm—Keck, Mahin & Cate

[57] ABSTRACT

A cable grip for improving the performance of cable bolts for ground support comprises a segmented wedge defining a cone, each segment having an inside cavity adapted to conform to a circumference of a cable and serrated grooves cut into said inside cavity to grip the cable, and a sleeve consisting of a plastic cone conforming to the conical shape of the wedge.

2 Claims, 1 Drawing Sheet

CABLE GRIP

This invention relates to a cable grip for improving the performance of cable bolts for ground support.

The use of cable bolts for support in underground mining is widespread. Steel cables are used to strengthen the rock mass. They are installed in holes drilled in the rock and bonded to the rock with grout. However, failure of cable bolts as support members commonly occurs through failure of the cable to grout bond. In order to improve the strength of the cable to grout bond, it has been proposed in Canadian Patent No. 1,059,351 granted Jul. 31, 1977 to provide protrusions, such as pressed ferrules, spaced along the length of the cable. However, such ferrules have to be preinstalled. Furthermore, they have no post peak strength.

It is the object of the present invention to provide a cable grip which may be easily installed underground at any location on a cable.

The cable grip, in accordance with the present invention, comprises a segmented wedge defining a cone, each segment of the cone having an inside cavity adapted to conform to a portion of the circumference of a cable and serrated grooves cut into such inside cavity to grip the cable, and a sleeve consisting of a plastic cone conforming to the conical shape of the wedge.

The sleeve completely covers the segmented wedge to prevent cement intrusion within the segmented wedge during grouting of the cable bolt.

The invention will now be disclosed, by way of example, with reference to the accompanying drawings in which.

Figure 1A:
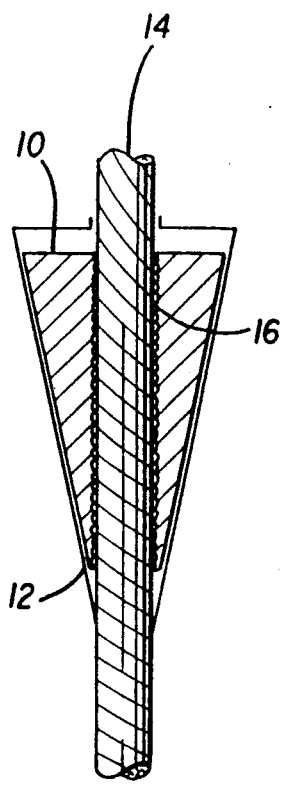
FIG. 1a is a section view through the cable grip.
Figure 1:
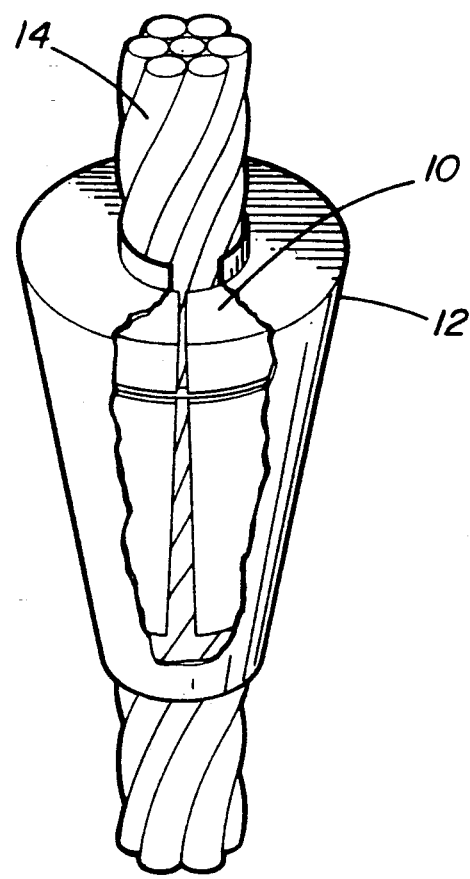
FIG. 1 is a perspective view of a cable grip in accordance with the invention.

Referring to the drawings, the cable grip comprises two main components: a segmented wedge 10 and a sleeve 12 which conforms to the wedge shape. The inside of the wedge fits around a standard steel cable 14 and has serrated grooves 16 cut into it to grip the cable. The sleeve consists of a plastic cone, about 1/32" thick which extends past the end of the wedge to allow adequate sliding of the wedge into the cone as shown in FIG. 1a. The sleeve is made of plastic material to allow the wedge to move easily within the sleeve. By controlling the length of the sleeve it is possible to control the stiffness of the support for varying ground conditions. The sleeve also keeps grout away from the wedge-cable contact. To ensure adequate protection of the grip from cement intrusion, the sleeve extends over the upper edge of the wedge and contacts the cable at the lower end of the wedge.

The cable grip, in accordance with the present invention, relies on the movement of the cable and grip, relative to the grout, to provide a clamping force to firmly attach the grip to the cable. To enable the grip to move relative to the grout, the segmented wedge is installed in a plastic sleeve. As load is applied to the cable, causing it to slide within the grout, the segmented wedge is pulled into its sleeve, wedging into the grout and causing the grip to tightly clamp the cable. Once the wedge has moved tightly into its sleeve, it cannot move without crushing grout. The wedging action of the wedge into its sleeve in the grout causes the grip to firmly bond to the cable. The wedge/sleeve assembly prevents failure of the cable to grout bond and improves the effectiveness of cable bolt support.

Segmented steel wedges from commercially available barrel and wedges are used as the wedge component of the cable grip. Zinc aluminum alloys as well as epoxy composites may also be used as replacements for steel wedges from commercial barrel and wedges. 1/32" thick Teflon cut from sheets may be used as the sleeve material.

Figure 2:
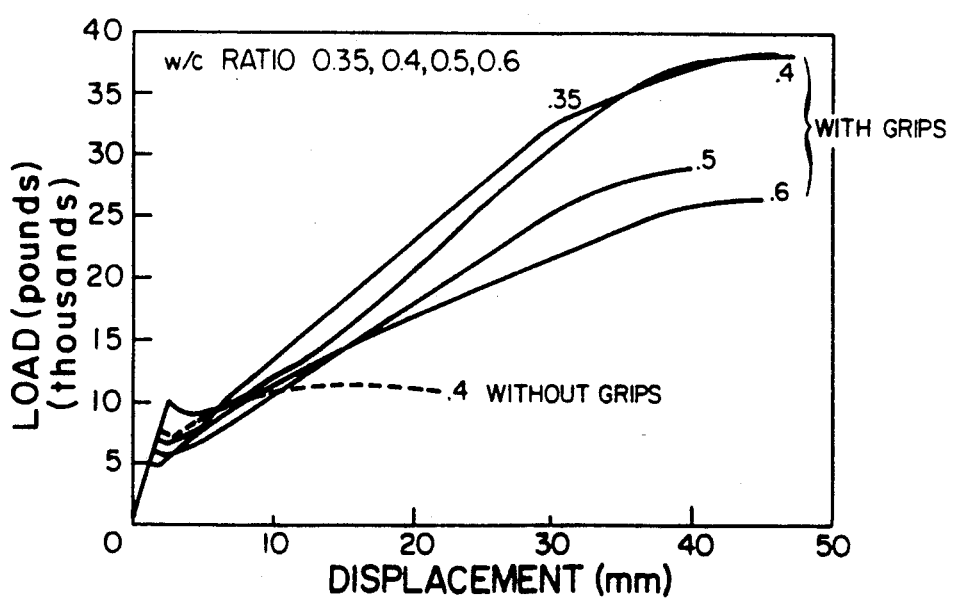
FIG. 2 shows comparative results of tests done on standard 12" cable bond lengths without grips compared with the same sample lengths with grips in 3" diameter steel pipes.

Laboratory testing has been conducted on the cable grip. Standard 12" cable lengths, without grips, were tested and compared with the same sample length with grips. The samples were cemented in steel pipes. Four series of tests were done with water/cement ratios of 0.35, 0.40, 0.50, and 0.60 after a 7 day cure. The steel pipes used in the test were 12" in length with an inside diameter of 2.5" and an outside diameter of 2.875". The grips were installed at the centre of the 12" bond length. The test results are shown in FIG. 2. A typical 12" bond length test with a 0.40 water/cement ratio, without a grip, is shown on the graph. The 12" bond length, with a grip and a 0.40 water/cement ratio has an over 3 fold increase in strength compared to standard tests without a grip. A 12" strength of 12,000 pounds is increased to 38,000 pounds, with a cable grip.

The loading of the cable grip produced a high horizontal pressure against the wall of the testing pipe which caused deformation of the pipe wall during the test. In a competent rock mass the rock would create much higher confinement than the pipe and the grips would be more effective in increasing the cable pull out strength.

Although the invention has been disclosed with reference to a preferred embodiment, it is to be understood that it is not limited to such embodiment and that other alternatives are also envisaged within the scope of the following claims.

We claim:

1. A cable grip for improving the performance of cable bolts which are installed in holes drilled in rock and bonded to the rock with grout for ground support, comprising:
   a) a segmented wedge defining a cone, each segment having an inside cavity adapted to conform to a circumference of a cable and serrated grooves cut into said inside cavity to grip the cable; and
   b) a sleeve surrounding the cone and consisting of thin plastic material conforming to the conical shape of the wedge for enabling the cone to slide within the sleeve, deform the sleeve and cause the cable grip to wedge into the grout.

2. A cable grip as defined in claim 1, wherein the sleeve completely covers the segmented wedge to prevent cement intrusion within the segmented wedge during grouting of the cable bolt.

* * * * *